United States Patent [19]

Burroughs

[11] 4,247,986
[45] Feb. 3, 1981

[54] PROJECTION MEASURING SCALE

[76] Inventor: Robert C. Burroughs, 11208 Evans Trail Apt. 102, Beltsville, Md. 20705

[21] Appl. No.: 632,968

[22] Filed: Nov. 18, 1975

Related U.S. Application Data

[63] Continuation-in-part of Ser. No. 11,586, Feb. 16, 1970, abandoned, which is a continuation-in-part of Ser. No. 561,925, Jun. 30, 1966, abandoned.

[51] Int. Cl.² ............................................... B43L 7/00
[52] U.S. Cl. ...................................................... 33/494
[58] Field of Search ........................... 33/107, 111, 113

[56]     References Cited
U.S. PATENT DOCUMENTS 3,202,129   8/1965   Weldon .............................. 116/329

OTHER PUBLICATIONS

"The Odd Rule," *Instruments & Automation*, Mar. 1958, Girard Schivley, p. 469.

*Primary Examiner*—Richard E. Aegerter

[57]     ABSTRACT

This invention, a measuring device, utilizes a projection of filtering method to facilitate reading of very fine lineal graduations such as 64ths, half millimeters and decimal hundredths of an inch whereby two series of lineal graduations perform two separate functions coordinating to filter lineal graduations through to the measuring edge. The first series extends to the measuring edge performing the measuring function, the second series pulling a short distance away from said edge providing a guidance means function while also indicating divisional breakdowns in fractions, millimeters and decimal hundredths.

3 Claims, 4 Drawing Figures

PROJECTION MEASURING SCALE

This invention is a Continuation-in-Part of my invention filed Feb. 16, 1970, Ser. No. 11,586, Group 240 for a Projection Measuring Scale, now abandoned, which is a Continuation-in-Part of my invention filed June 30, 1966, Ser. No. 561,925, Group 280 for a Projection Measuring Scale, now abandoned.

I will initially explain in brief and concise form the basic function of the invention for rulers in 64th graduations, ½ millimeter graduations and the decimal scale, and then explain in explicit detail how this aforementioned function enables one to read these lineal graduations with greater ease and improved accuracy.

Any ruler having fine measuring graduations always has divisional breakdowns in said graduations such as fractional breakdowns for the English system, decimal breakdowns for the decimal scale and centimeter and millimeter breakdowns for the metric scale. Consequently, when indicating fine graduations such as 64ths, any even numbered 64th would also represent 32nds. For example, 2/64 would also represent 1/32. Inasmuch as it is standard practice to have a companion set of 32nd graduations on the opposing edge of the ruler it is not necessary to bring the even numbered 64ths to the measuring edge if a means can be provided that will enable the reader to relate the sought after odd 64ths of the ruler structure and its divisional breakdowns. Such a means if provided would considerably benefit the reader by eliminating eye strain at the measuring edge since the spacing at said measuring edge would be doubled. This means has been provided by retaining even 64ths representing divisional breakdowns but keeping them away from the measuring edge and closely adjacent to said measuring edge. Said even 64ths are referred to as "projection lines" as they perform the function of maintaining the ruler structure and providing perception so that when the line is selected at the measuring edge it visually and literally becomes part of the total ruler structure and its divisional breakdowns. Instead of being separated from the ruler structure the selected line is projected by the projection lines in a unique manner than not only allows for easier reading of the lines at the measuring edge but also allows for greater spacing and easier reading of the divisional breakdowns away from said measuring edge. The illusion on conventional rulers of fine 64th graduations meshing together causing a mass blur has been eliminated.

The same basic principle applys to the metric ruler having fine ½ millimeter graduations. The divisional breakdowns in centimeters are retained as projection lines but kept away from the measuring edge and closely adjacent to said measuring edge to enable the reader to relate the sought after ½ millimeter graduation to the ruler structure and its divisional breakdowns.

The same basic principle applys to the decimal ruler indicating decimal hundredths. The divisional breakdowns in decimal 10ths of an inch are retained as projection lines but kept away from the measuring edge and closely adjacent to said measuring edge to enable the reader to relate the sought after odd hundredth to the ruler structure and its divisional breakdowns.

Like the 64th ruler and its usual companion set of 32nd graduations it is considered standard practice for both decimal rulers and ½ millimeter metric rulers to also have companion sets of graduations on the opposing edge of the ruler representing the next higher divisional breakdown. On each of the aforementioned fractional, millimeter and decimal sets of lineal graduations there are quick reading numbers at divisional breakdowns.

I will now explain in more explicit detail how the function of the ruler enables one to read these lineal graduations in fractions, the metric system and the decimal system with greater ease and accuracy.

Regarding the fractional graduations, since every odd 64th graduations represents a divisional breakdown from a higher fraction a horizontal line joins each consecutive pair of odd 64ths to its nearest larger divisional breakdown which will always be in sixteenths, eighths, quarters, halfs or whole inches. Thus, with the 64th graduations the divisional breakdowns are such that each and every line at the measuring edge has direct continuity with its corresponding projection line indicating a fractional breakdown. When the user wishes to relate the measuring line to its proper relationship with the ruler structure he needs only to find which quick reading number it is under. If the line is to the left of said number the numerical value is one less than said quick reading number and if it is to the right of said number the numerical value is one more than said quick reading number.

The metric ruler in ½ millimeters uses the same basic principle of coordinating its projection lines closely adjacent to the measuring edge with the lines at the measuring edge.

The standard millimeter ruler is dependent upon the centimeter as its basic numerical quotient, the millimeter representing the final metric breakdown from 1 centimeter that can be seen on a flat measuring ruler without the aid of sophisticated measuring instruments. However, it is standard for millimeter rulers to show further divisional breakdowns by reverting back to the English system and indicating half a centimeter (5 millimeters) by different line lengths, and on the finer graduated rulers indicating half a millimeter which can be read without the aid of sophisticated measuring instruments.

Therefore, geometrical patterns are formed at the divisional metric breakdown at every centimeter and at the divisional English breakdown at every ½ centimeter. The lines at the measuring edge indicate ½ millimeters. The projection lines closely adjacent to the measuring edge indicate centimeters and half centimeters. A horizontal line joins each consecutive pair of ½ millimeters on either side of each centimeter to form a geometrical pattern. Likewise, a similar horizontal line joins each consecutive pair of ½ millimeters on either side of each half centimeter (indicated by the quick reading number 5) to form a similar geometrical pattern.

Quick reading numbers at every 2½ and 7½ millimeters are provided to complete the coordination needed between the lines at the measuring edge and the closely adjacent projection lines.

The sequence of the lines at the measuring edge follow and read consecutively ½ millimeter, 1½ millimeters, 2½ millimeters, 3½ millimeters, 4½ millimeters, 5½ millimeters, etc., bearing in mind that whole millimeters would normally appear as a companion set of graduations on the opposing edge of ½ millimeter metric rulers.

It is now possible for the reader to select any line at the measuring edge without having to count over (backward or forward) more than one line. The reader will either count over one line to the nearest centimeter or one line over to the nearest 5 millimeters (half centimeter), or one line over from a quick reading number 2½ or 7½, or else if the sought after line is 2½ or 7½ millimeters he has no line to count over.

The decimal ruler in 100ths of an inch also uses the same basic principle of coordinating its projection lines closely adjacent to the measuring edge with the lines at the measuring edge.

Said decimal ruler has only two divisional breakdowns from one inch, namely, 10ths and 100ths. The lines at the measuring edge indicate 100ths; the projection lines closely adjacent to the measuring edge indicate 10ths of an inch or whole inches. A horizontal line joins each consecutive pair of 100ths on either side of each 10th part of an inch or each whole inch.

Quick reading numerals at every line representing 0.050 are provided to complete the coordination needed between the lines at the measuring edge and the closely adjacent projection lines.

The sequence of the lines at the measuring edge follow and read consecutively 1 hundredth, 3 hundredths, 5 hundredths, 7 hundredths, 9 hundredths, 11 hundredths, etc., bearing in mind that the even hundredths represent 50ths of an inch and would normally appear as a companion set of graduations on the opposing edge of decimal rulers.

It is now possible for the reader to select any line at the measuring edge without having to count over (backwards or forwards) more than one line. The reader will either count over one line to the nearest inch or one line over to the nearest 10th of an inch or one line over from 0.050 of an inch (under quick reading numeral 5) or else if the sought after line is 0.050 he has no line to count over.

A further object of the invention is to introduce to the art for the first time the coordination of individual geometrical patterns with ruler structure for clearer perception.

A further object of the invention is to introduce non measuring lineal graduations which provide a guidance means function.

A further object of the invention is to provide an improved visual relationship between divisional breakdowns of fine ruler graduations.

Other objects and advantages will become apparent from a consideration of the following description and the appended claims in conjunction with the accompanying drawings wherein:

Figure 1:
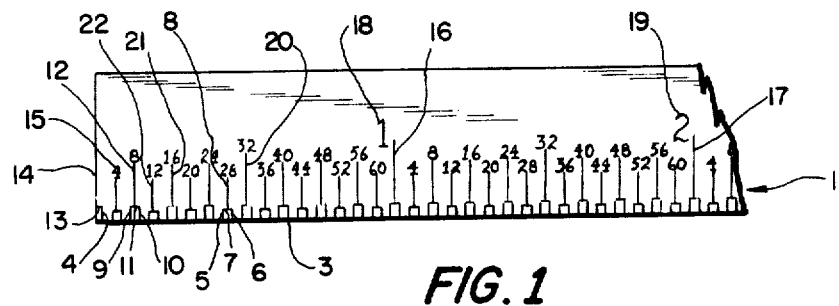
FIG. 1 is a partial plan view of the improved ruler with odd 64th graduations utilizing geometrical patterns at the measuring edge for closer continuity with the projection lines away from the measuring edge.

With continued reference to the drawings, the ruler 1 of FIG. 1 has lineal scale graduations of 1/64 of an inch indicated by vertical lines disposed transversely of said ruler said vertical lines representing a first and second set of lineal graduations.

Said first set of lineal graduations extend from the measuring edge and are the measuring lines representing odd 64ths beginning with the first measuring line 4 indicating 1/64. The shorter lines as shown at 5 and 6 respectfully are joined together by a horizontal transverse extension 7 forming a geometrical pattern and providing an adjoining means with the first and second set of lineal graduations. A perpendicular line 8 representing a given 1/16th adjoins said horizontal transverse extension 7 intermediate the width of said horizontal transverse extension.

The longer lines at the measuring edge as shown at 9 and 10 are also joined together by a horizontal transverse extension 11 and consequently form a taller geometrical pattern. A perpendicular line 12 representing a given 8th adjoins said horizontal transverse extension 11 intermediate the width of said horizontal transverse extension. While the shorter geometrical patterns will always be under a line representing 16ths the longer geometrical patterns will be under the lines representing 8ths or a divisional breakdown upwards from ⅛ such as 2/8 representing a divisional breakdown upwards of ¼ or 4/8 representing ½, etc.

At the beginning of the ruler 1 a horizontal line 13 joins the aforementioned first measuring line 4 which represents 1/64 to the side edge 14 of said ruler to form a narrower geometrical pattern because the ruler begins at this position and the normal width of the geometrical patterns consequently cannot be maintained.

All the lines that extend vertically upward from the aforementioned geometrical patterns represent the aforementioned second set of lineal graduations which perform the guidance means function and are known and referred to as projection lines which maintain the ruler structure. These lines which are the even 64ths represent all the divisional breakdowns upward from the 64ths lines at the measuring edge which include 32nds, 16ths, 8ths, quarters and halfs.

Quick reading numbers are directly over each divisional breakdown of 1/16 and upward beginning with the first quick reading number four at 15. These quick reading numbers indicate the number of 64ths which the line immediately underneath represents. Consequently, any line at the measuring edge to the left of the line under the quick reading number represents one number lower than said quick reading number and if it is to the right it represents one number higher than said quick reading number.

The two longest vertically extending projection lines 16 and 17 represent one and two inches respectfully and are identified by the larger numbers 1 and 2 as shown at 18 and 19 respectfully. Divisional breakdowns are further indicated by varying the degree of length of the lines relative to the size of the divisional breakdowns, the longer lines representing the larger fractional breakdowns and the shorter lines representing the smaller fractional breakdowns.

The next divisional breakdown of ½ inch is indicated by the next longest projection line 20.

Notation: On rulers having nothing finer than 32nd scale graduations in a given set it is usually standard to indicate different lengths for ¼ and ⅛ graduations but inasmuch as most standard precision rulers having 64th graduations maintain the same length for the ¼ and ⅛ graduations for clarity this 64th ruler also maintains the same length for the ¼ and ⅛ graduations for clarity.

The next divisional breakdown of ⅛ inch (and also for ¼'s) is indicated by the next longest projection line 21.

The next divisional breakdown of 1/16 inch is indicated by the next longest projection line 22.

Figure 2:
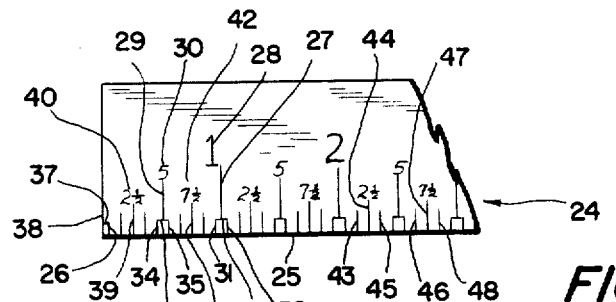
FIG. 2 is a partial plan view of the improved ruler with metric ½ millimeter graduations utilizing geometrical patterns at the measuring edge for closer continuity with the projection lines away from the measuring edge.

The ruler 24 of FIG. 2 has lineal scale graduations of the metric system indicated by vertical lines disposed transversely of said ruler. The lines at the measuring edge 25 which perform the measuring function represent ½ millimeters beginning with the first ½ millimeter line 26. The projection lines away from said measuring edge which maintain the ruler structure represent whole centimeters and half centimeters (or 5 millimeters). Said whole centimeter lines are the longest of the projection lines and begin with the first whole centimeter line 27, there being a larger number one 28 directly over said line to indicate the initial 1 centimeter.

The shorter projection lines representing a half centimeter begin with the first half centimeter line 29, there being a smaller quick reading number 30 directly over said line to indicate a value of 5 millimeters (which is the same as a half centimeter).

The two measuring lines 31 and 32 at the measuring edge 25 on either side of the whole centimeter line 27 represent 9½ and ½ millimeters respectfully reading from left to right. A horizontal line 33 joins together the two said measuring lines 31 and 32 forming a geometrical pattern. The aforementioned whole centimeter line 27 is perpendicular to said horizontal line 33 and adjoins said horizontal line intermediate the width of said line.

The two measuring lines 34 and 35 at the measuring edge 25 on either side of the half centimeter line 29 represent 4½ and 5½ millimeters respectfully reading from left to right. A horizontal line 36 joins together the two said measuring lines 34 and 35 forming a geometrical pattern. The aforementioned half centimeter line 29 is perpendicular to said horizontal line 36 and adjoins said horizontal line intermediate the width of said line.

The aforementioned measuring lines at the measuring edge which become part of geometrical patterns associated with the whole centimeter and half centimeter projection lines as indicated at 31, 32, 34 and 35 are noticeably shorter than the remaining lines at the measuring edge.

At the beginning of the ruler 24 a horizontal line 37 joins the first measuring line 26 which represents ½ millimeter to the side edge 38 of said ruler to form a narrower geometrical pattern because the ruler begins at this position and the normal width of the geometrical patterns consequently cannot be maintained.

To clarify the ruler the lines at the measuring edge representing 2½ and 7½ millimeters are the longest of the measuring lines because they are strategically located midway between a given whole centimeter and a given half centimeter beginning with the first 2½ millimeter line 39 having its quick reading number 40 directly overhead indicating 2½. The first 7½ millimeter line 41 has its quick reading number 42 directly overhead indicating 7½.

The lines on either side of a given 2½ millimeters and on either side of a given 7½ millimeters are the second longest lines at the measuring edge and are read simply by subtracting one from the given figure if the line is to the left of said figure or adding one to the given figure if the line is to the right of said figure. For example:

The line 43 to the left of the third 2½ line 44 indicates 1½ millimeters.

The line 45 to the right of the third 2½ line 44 indicates 3½ millimeters.

The line 46 to the left of the third 7½ line 47 indicates 6½ millimeters.

The line 48 to the right of the third 7½ line 47 indicates 8½ millimeters.

Figure 3:
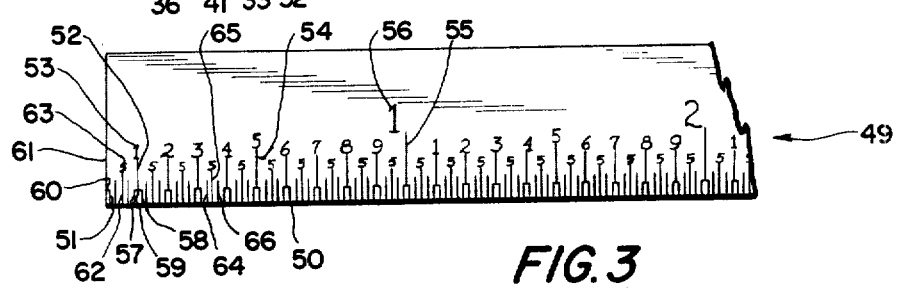
FIG. 3 is a partial plan view of the improved ruler with odd decimal hundredth graduations utilizing geometrical patterns at the measuring edge for closer continuity with the projection lines away from the measuring edge.

The ruler 49 of FIG. 3 has lineal scale graduations of decimal hundredths of an inch indicated by vertical lines disposed transversely of said ruler.

The lines at the measuring edge 50 which perform the measuring function represent odd hundredths beginning with the first odd hundredth line 51.

The projection lines away from said measuring edge which maintain the ruler structure represent decimal tenths of an inch beginning with the first decimal tenth line 52.

Quick reading numbers are directly over each decimal 10th of an inch beginning with the first quick reading number one at 53.

To clarify the ruler structure the projection lines representing ½ inch (or 5 tenths) of an inch are slightly longer than the other decimal lines beginning with the first ½ inch line 54.

The projection lines representing a given whole inch (or 10 tenths) are the longest of the projection lines beginning with the first inch line 55. Said inch line is identified by the larger numeral one at 56.

The two measuring lines 57 and 58 at the measuring edge 50 on either side of the decimal tenth line 52 represents 9/100ths and 11/100ths respectfully reading from left to right. A horizontal line 59 joins together the two said measuring lines 57 and 58 forming a geometrical pattern. The aforementioned decimal tenth line 52 is perpendicular to said horizontal line 59 and adjoins said horizontal line intermediate the width of said line. The aforementioned measuring lines 57 and 58 at the measuring edge 50 which become part of a geometrical pattern are noticeably shorter than the remaining lines at said measuring edge.

At the beginning of the ruler 49 a horizontal line 60 joins the first measuring line 51 to the side edge 61 of said ruler to form a narrower geomtrical pattern because the ruler begins at this position and the normal width of the geometrical patterns consequently cannot be maintained.

To clarify the ruler the lines at the measuring edge 50 representing 5 hundredths are the longest of the measuring lines because they are strategically located midway between tenths of an inch beginning with the first 5 hundredth line 62. Each of these 5 hundredth lines have a smaller quick reading number five directly overhead as shown at 63.

The lines on either side of a given 5 hundredths are the second longest lines at the measuring edge and are read simply by subtracting 2 from the given 5 hundredths if the line is to the left of said 5 hundredths or adding 2 to the given 5 hundredths if the line is to the right of said 5 hundredths. For example:

The line 64 to the left of the fourth five hundredth line 65 indicates 3 hundredths.

The line 66 to the right of the fourth five hundredth line 65 indicates 7 hundredths.

Figure 4:
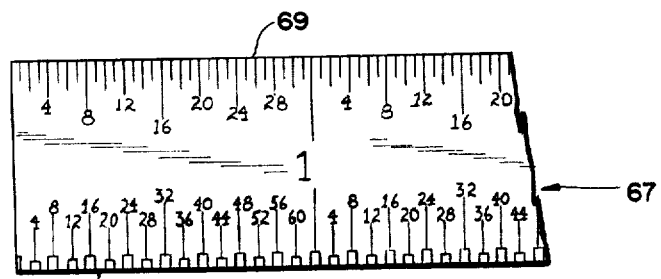
FIG. 4 is a partial plan view of the improved ruler with odd 64th graduations showing how the ruler can use the common practice of having 64th graduations at one edge and a companion set of 32nd graduations (which would represent even 64ths) on its opposing edge without any of the lines meshing into a blur and causing eye strain.

The ruler 67 of FIG. 4 has 64th graduations of the new improved projection measuring scale extending from the lower edge 68 and a companion scale of 32nd graduations on its opposing straight edge as indicated at 69. This ruler indicates how both odd and even numbered 64ths can be measured with clarity when a projection measuring scale is incorporated for the finer graduations. However, the ruler structure and its divisional breakdowns are still maintained for both of the companion sets of scale graduations.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A measuring ruler having a straight measuring edge and a first and second set of lineal graduations representing a unit of measure, said first set of lineal graduations being equally spaced apart, said second set of lineal graduations being equally spaced apart, said lineal graduations being perpendicular to said measuring edge, said first set of lineal graduations intersecting said measuring edge and representing odd numbered graduations, said second set of lineal graduations representing even numbered graduations and being parallel with said first set and spaced from said measuring edge, there being a plurality of individual equally spaced geometrical patterns, each of said patterns being disconnected from adjacent geometrical patterns, said patterns being formed from lineal graduations selected from said first set, adjacent lineal graduations of said second set, and transverse lineal extensions, each of said patterns being formed by a first lineal graduation extending from said measuring edge being joined by a said transverse extension with a second lineal graduation adjacent to said first lineal graduation and also extending from said measuring edge, said transverse extension being perpendicular to the two aforementioned lineal graduations to form an individual geometrical pattern, there being a lineal graduation of said second set intersecting said transverse extension midway between the two aforementioned adjacent lineal graduations, said lineal graduation of said second set having an adjacent numerical identification for quicker and easier reading.

2. A measuring ruler having a straight measuring edge and a first and second set of lineal graduations representing a unit of measure and functioning in tandem, said first set of lineal graduations being equally spaced apart, said second set of lineal graduations being equally spaced apart, said first set providing a measuring means of odd numbered lineal graduations, said second set providing a guidance means of even numbered lineal graduations for quicker and easier reading of said first set, said first set intersecting said measuring edge and being perpendicular to said measuring edge, said second set being parallel with said first set and spaced from said measuring edge, each of said second set of lineal graduations having an adjacent numerical identification, graduations of said second set having adjoining means with pairs of graduations of said first set, the tandem functioning enabling the reader upon selecting a said numerically identified lineal graduation of said second set to optically follow same to a selected lineal graduation of said first set at said measuring edge, or vice versa, there being means provided to prevent the eye from optically following incorrectly a lineal graduation of either said first or second set.

3. A measuring ruler as described in claim 2, said means provided to prevent the eye from optically following incorrectly a lineal graduation of either said first or second set comprising a plurality of individual equally spaced geometrical patterns, each of said patterns being disconnected from adjacent geometrical patterns, said patterns being formed from lineal graduations selected from said first set, adjacent lineal graduations of said second set, and transverse lineal extensions, each of said patterns being formed by a first lineal graduation extending from said measuring edge being joined by a said transverse extension with a second lineal graduation adjacent to said first lineal graduation and also extending from said measuring edge, said transverse extension being perpendicular to the two aforementioned lineal graduations to form an individual geometrical pattern, there being a lineal graduation of said second set intersecting said transverse extension midway between the two said adjacent lineal graduations.

* * * * *